United States Patent
Gunther et al.

(10) Patent No.: US 10,573,873 B2
(45) Date of Patent: Feb. 25, 2020

(54) TERMINAL LOCATING FEATURE FOR A BATTERY ASSEMBLY

(71) Applicant: FORD GLOBAL TECHNOLOGIES, LLC, Dearborn, MI (US)

(72) Inventors: Tom M. Gunther, Canton, MI (US); Rajaram Subramanian, Ann Arbor, MI (US); Adam Denlinger, Saline, MI (US); Stuart Schreiber, Inkster, MI (US); Ronald D. Gilland, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1241 days.

(21) Appl. No.: 14/476,168

(22) Filed: Sep. 3, 2014

(65) Prior Publication Data

US 2016/0064721 A1    Mar. 3, 2016

(51) Int. Cl.
| | |
|---|---|
| *H01M 2/30* | (2006.01) |
| *H01M 2/20* | (2006.01) |
| *B23K 26/22* | (2006.01) |
| *B23K 26/32* | (2014.01) |
| *B23K 101/36* | (2006.01) |
| *B23K 101/38* | (2006.01) |

(52) U.S. Cl.
CPC ............ *H01M 2/305* (2013.01); *B23K 26/22* (2013.01); *B23K 26/32* (2013.01); *H01M 2/206* (2013.01); *B23K 2101/36* (2018.08); *B23K 2101/38* (2018.08); *H01M 2/202* (2013.01); *H01M 2/30* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 5,804,770 A * | 9/1998 | Tanaka ............... | H01M 2/206 174/138 F |
| 2006/0234119 A1* | 10/2006 | Kruger ............... | H01M 2/1061 429/160 |
| 2012/0171533 A1 | 7/2012 | Maguire et al. | |
| 2012/0177952 A1 | 7/2012 | Maguire et al. | |
| 2013/0177795 A1 | 7/2013 | Power et al. | |
| 2014/0099819 A1 | 4/2014 | Silk et al. | |

FOREIGN PATENT DOCUMENTS

| | | |
|---|---|---|
| CN | 101142699 | 3/2008 |
| CN | 102544411 | 7/2012 |
| EP | 2749444 | 7/2014 |
| WO | 2012142583 | 10/2012 |

* cited by examiner

*Primary Examiner* — Haixia Zhang
(74) *Attorney, Agent, or Firm* — Carlson, Gaskey & Olds, P.C.

(57) ABSTRACT

An exemplary battery assembly includes a first terminal holder, and a terminal at least partially surrounded by the first terminal holder. The first terminal holder includes a locating feature to position the first terminal holder relative to a second terminal holder.

17 Claims, 6 Drawing Sheets

TERMINAL LOCATING FEATURE FOR A BATTERY ASSEMBLY

TECHNICAL FIELD

This disclosure relates to locating components of an electrified vehicle and, more particularly, to electrically connecting bus bars to terminals within a battery assembly of the electrified vehicle.

BACKGROUND

Generally, electrified vehicles differ from conventional motor vehicles because electrified vehicles include one or more electric machines powered by batteries. The electric machines can selectively drive the vehicle. Conventional motor vehicles, in contrast to electrified vehicles, are driven exclusively by an internal combustion engine. Example electrified vehicles include hybrid electric vehicles (HEVs), plug-in hybrid electric vehicles (PHEVs), and battery electric vehicles (BEVs).

Electrified vehicle battery assemblies include one or more battery cells that are configured in a series, or series-parallel, string in order to obtain the voltage and power levels that are necessary to drive the electrified vehicle. The battery cells must be reliably connected to one another in order to achieve these voltage and power levels. Bus bars may be used to electrically connect the battery cells of a battery assembly.

SUMMARY

A battery assembly according to an exemplary aspect of the present disclosure includes, among other things, a first terminal holder, and a terminal at least partially surrounded by the first terminal holder. The first terminal holder includes a locating feature to position the first terminal holder relative to a second terminal holder.

In a further non-limiting embodiment of the foregoing assembly, positioning the first terminal holder relative to the second terminal holder positions the terminal in welding position.

In a further non-limiting embodiment of any of the foregoing assemblies, the locating feature comprises an extension.

In a further non-limiting embodiment of any of the foregoing assemblies, the second terminal holder includes an aperture to receive the extension.

In a further non-limiting embodiment of any of the foregoing assemblies, the locating feature comprises an extension extending from a first side of the first terminal holder. The first terminal holder includes an aperture in a second side to receive an extension of third terminal holder. The first side faces away from the second side.

In a further non-limiting embodiment of any of the foregoing assemblies, the locating feature positions the first terminal holder relative to the second terminal holder to position the terminal vertically and horizontally.

In a further non-limiting embodiment of any of the foregoing assemblies, the assembly includes a flange of the first terminal holder that electrically isolates the terminal from a sidewall of a battery pack.

In a further non-limiting embodiment of any of the foregoing assemblies, the assembly includes a bus bar welded to both the terminal at least partially surrounded by the first terminal holder and a terminal at least partially surrounded by the second terminal holder.

A battery assembly according to an exemplary aspect of the present disclosure includes, among other things, a first terminal holder at least partially surrounding a first terminal, a second terminal holder at least partially surrounding a second terminal, and a bus bar module attached to both the first terminal and second terminal. The first terminal holder engages the second terminal holder through a locator that vertically positions the first terminal relative to the second terminal.

In a further non-limiting embodiment of the foregoing assembly, the locator comprises an extension receivable within an aperture.

In a further non-limiting embodiment of any of the foregoing assemblies, the first terminal holder includes the extension and the second terminal holder provides the aperture. The first terminal holder further includes an aperture to receive an extension of a third terminal holder.

In a further, non-limiting embodiment of any of the foregoing assemblies, the bus bar module is welded to the first terminal and the second terminal.

In a further, non-limiting embodiment of any of the foregoing assemblies, the bus bar module is laser welded to the first terminal and the second terminal.

In a further, non-limiting embodiment of any of the foregoing assemblies, the first terminal holder engages the second terminal holder through a locator to vertically and horizontally position the first terminal relative to the second terminal.

In a further, non-limiting embodiment of any of the foregoing assemblies, a flange of the first terminal holder electrically isolates the terminal from a side rail of a battery pack.

A method according to an exemplary aspect of the present disclosure includes, among other things, engaging a first terminal holder with a second terminal holder to locate a terminal of a battery assembly. The method includes welding the bus bar module to the terminal after the engaging.

In a further non-limiting embodiment of the foregoing method, the engaging comprises inserting an extension of one of the first terminal holder or the second terminal holder into an aperture in the other of the first terminal holder or the second terminal holder.

In a further non-limiting embodiment of the foregoing method, the method further includes compressing battery cells axially during the engaging, the first terminal holder mounted to an upwardly facing surface of a first battery cell, the second terminal holder mounted to an upwardly facing surface of a second battery cell.

In a further non-limiting embodiment of the foregoing method, the welding comprises laser welding.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a locating feature and method for locating a terminal of a battery cell of an electrified vehicle battery assembly in a position suitable for welding a bus bar. The locating feature is incorporated into a terminal holder. Adjacent terminal holders within the battery pack engage each other through the locating feature. A bus bar of the bus bar module can be welded to the terminal to electrically connect the battery cells of the battery assembly when the locating features are engaged. These and other features are discussed in greater detail herein.

Figure 1:
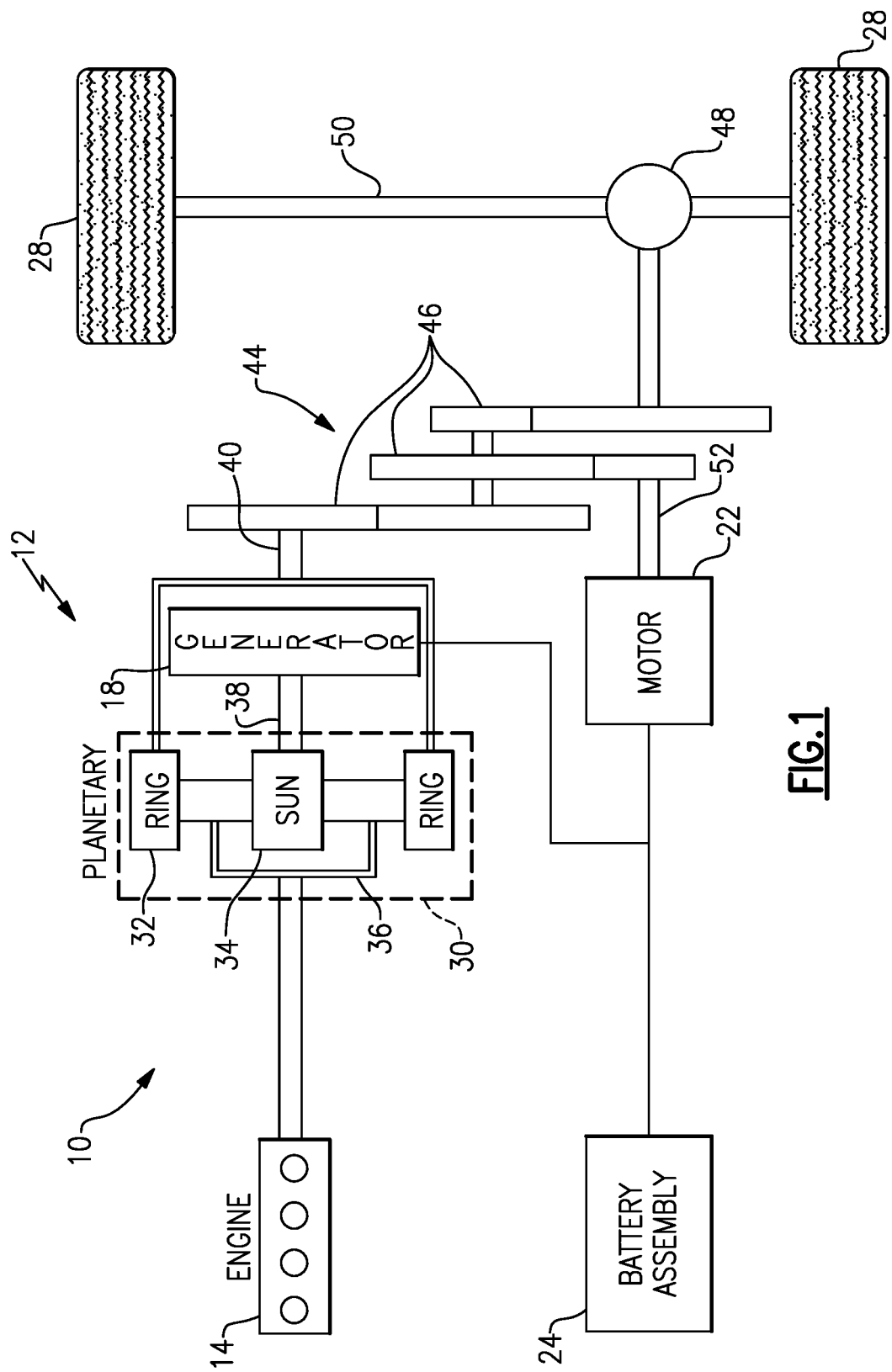
FIG. 1 is a schematic view of a powertrain of an example electrified vehicle.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including but not limited to, plug-in hybrid electric vehicles (PHEVs) and battery electric vehicles (BEVs).

In one embodiment, the powertrain 10 is a powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 may be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be could also be used.

The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In some embodiments, the motor 22 and the generator 18 cooperate as part of a regenerative braking system in which both the motor 22 and the generator 18 can be employed as motors to output torque. For example, the motor 22 and the generator 18 can each output electrical power to the battery pack 24 through a bus bar 56.

The battery pack 24 is an example type of electric vehicle battery assembly. The battery pack 24 may be a high voltage battery that is capable of outputting electrical power to operate the motor 22 and the generator 18. Other types of energy storage devices and/or output devices can also be used with the electric vehicle.

Figure 2:
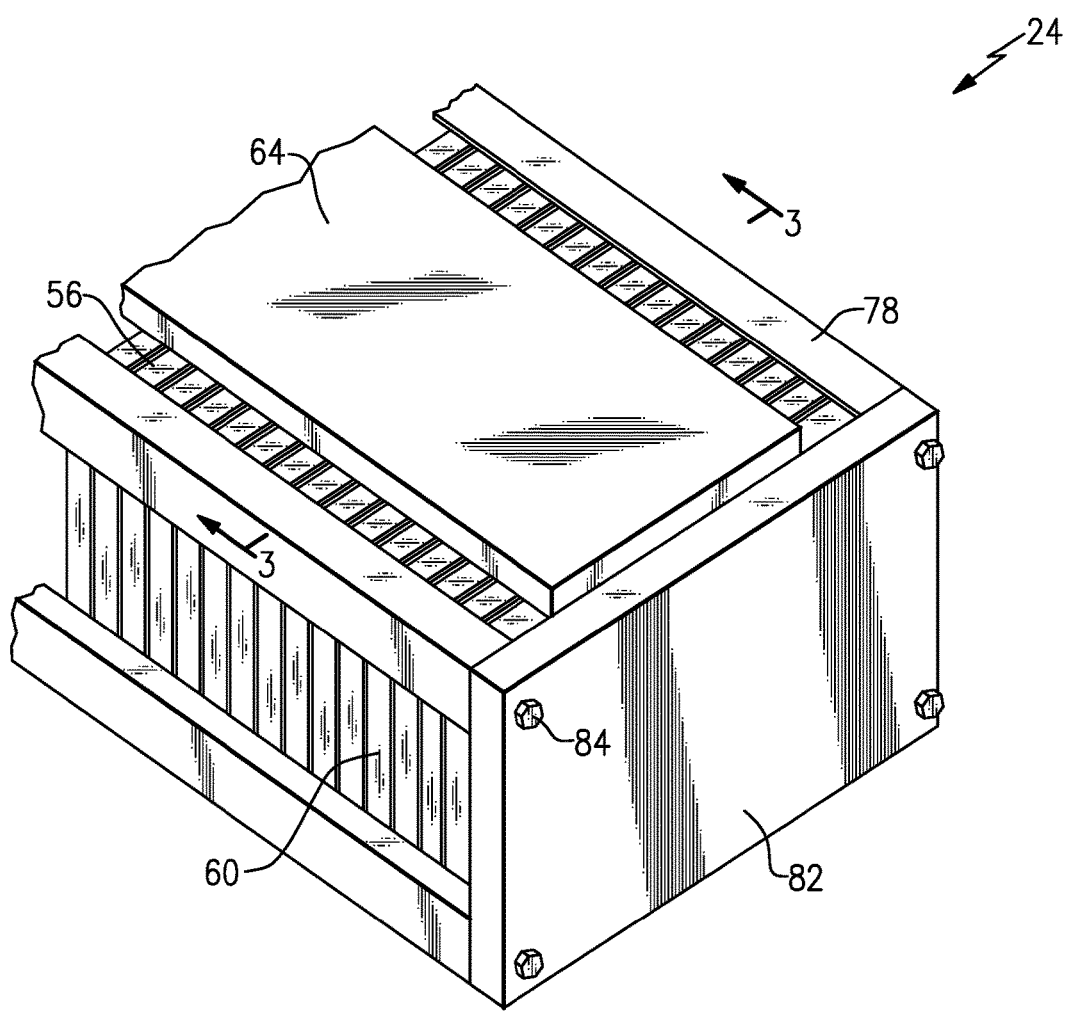
FIG. 2 shows a perspective view of a portion of a battery pack from the powertrain of FIG. 1.
Figure 3:
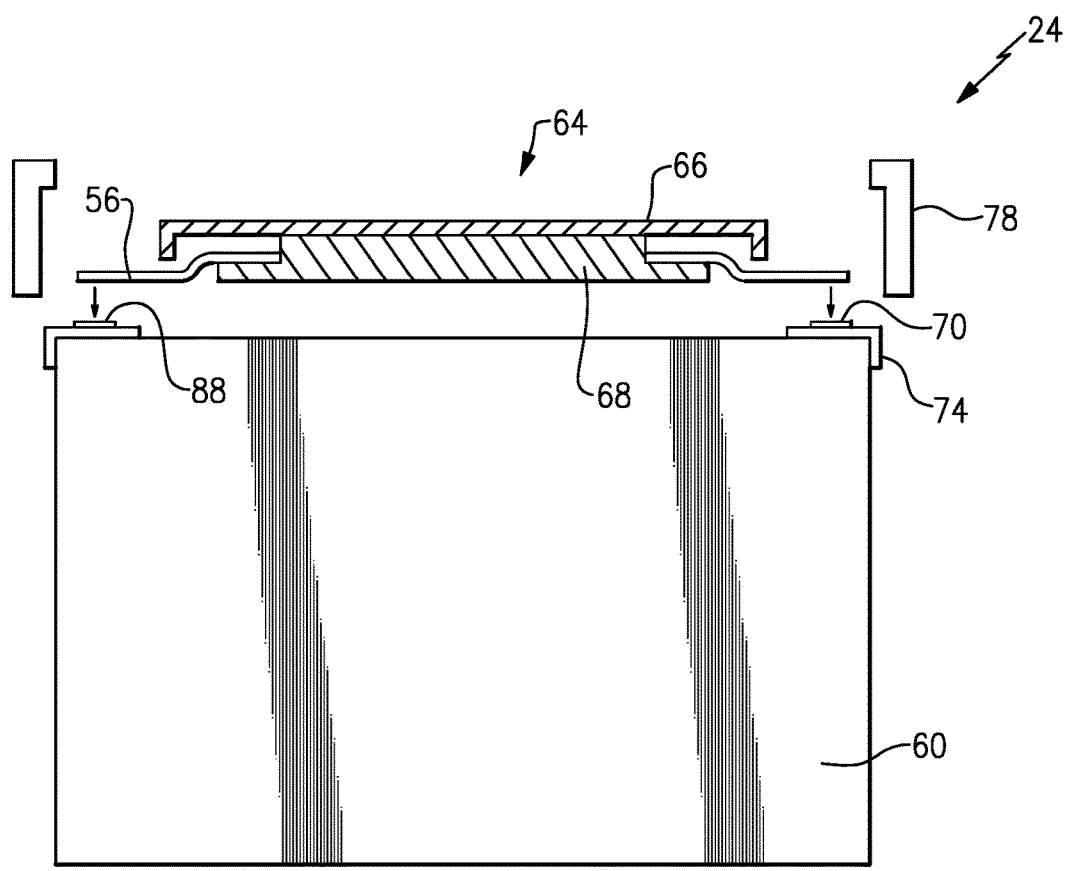
FIG. 3 shows a section view at Line 3-3 in FIG. 2.
Figure 4:
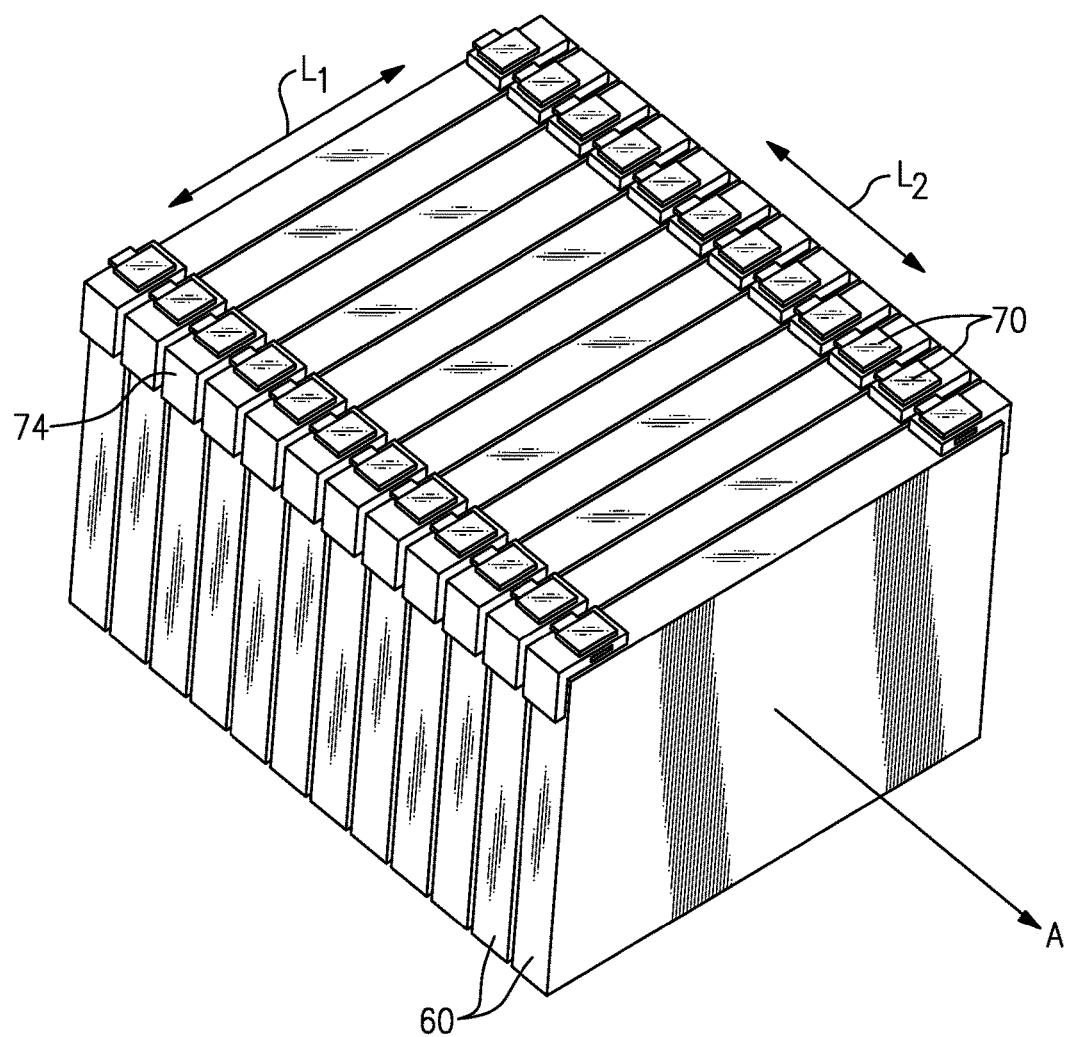
FIG. 4 shows a battery array from the portions of the battery pack shown in FIG. 2.

Referring now to FIGS. 2 to 4, the battery pack 24 includes a plurality of battery cells 60. The battery cells 60 store power. The bus bar 56 electrically couples the plurality of battery cells 60 together. The example bus bar 56 is a relatively high-voltage bus that is also in electrical communication with the motor 22 and generator 18. Power is selectively communicated away from the battery cells 60 through the bus bar 56. The power is used to drive the motor 22.

The bus bar 56 is part of a bus bar module 64. Within the bus bar module 64, the bus bar 56 is held between a first cover 66 and a second cover 68. The covers are a polymer material, in this example, and the bus bar 56 is a metallic, conductive material.

The battery cells 60 are prismatic cells in this example. The battery cells 60 each include terminals 70. Current moves between the bus bar 56 and the battery cells 60 through the terminals 70.

A terminal holder 74 at least partially surrounds the terminals 70. The terminal holders 74 are a dielectric material in this example. The dielectric electrically isolates the terminals 70 from areas of the battery pack 24 other than the bus bar 56. The terminal holder 74 can also protect the terminals 70.

The example bus bar 56 is directly connected to the terminals 70. The bus bar 56 may be made of a metallic, conductive material similar (or dissimilar) to that of the terminals 70.

Within the battery pack 24, the battery cells 60 are arranged along an axis A. Separators can be positioned axially between the battery cells 60. The separators can include channels for communicating cooling fluid, such as air, through the battery cells 60 of the battery pack 24.

The battery cells 60 are housed within support structures, such as sidewalls 78 and endwalls 82. The endwalls 82 may be secured to the sidewalls 78 via mechanical fasteners 84. Securing the endwalls 82 compresses the cells 60 along the axis A.

When assembling the battery pack 24, the cells 60 are secured within the support structures, and the bus bar 56 is then electrically connected to the terminals 70. The bus bar 56 is laser welded to the terminals 70 to secure the bus bar 56 to the terminals 70. Laser welding is used in this example. Other types of welding may be utilized in other examples.

The terminals 70 each include an upwardly facing surface 88. The example bus bar 56 is welded to the upwardly facing surfaces 88. As can be appreciated, variations in the position of the upwardly facing surface 88 of one cell 60 relative to other cells 60 of the battery pack 24 can weaken the bond between the bus bar 56 and the terminals 70 during the welding. The example battery pack 24 includes features to reduce variations in the vertical and horizontal positions of the terminals 70 relative to each other, and specifically variations in the upwardly facing surfaces 88.

Figure 5:
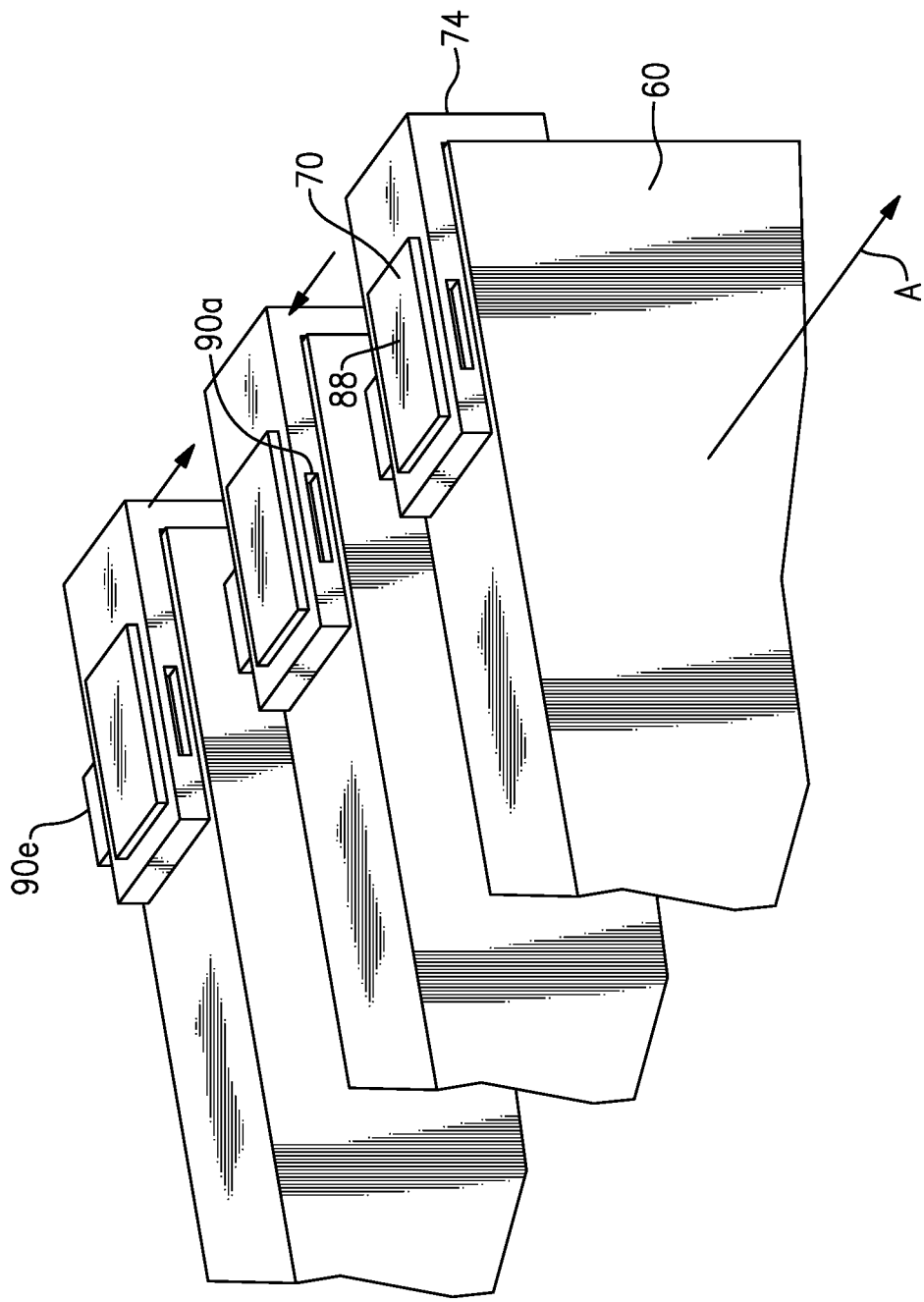
FIG. 5 shows selected portions of FIG. 4 during assembly.
Figure 6:
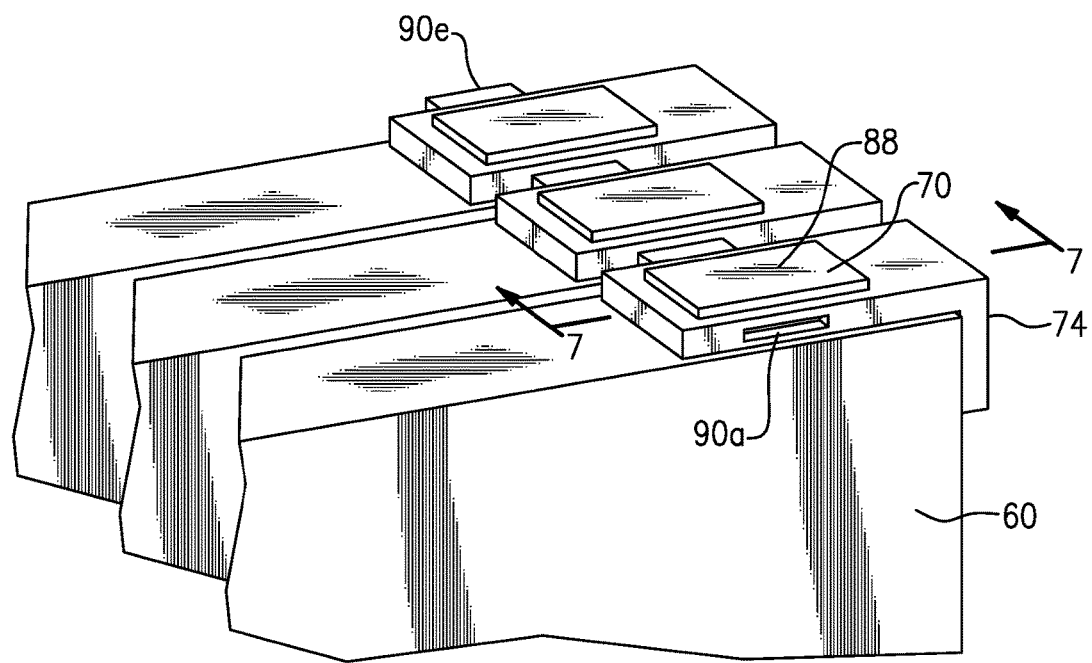
FIG. 6 shows the selected portions of FIG. 4 after assembly.
Figure 7:
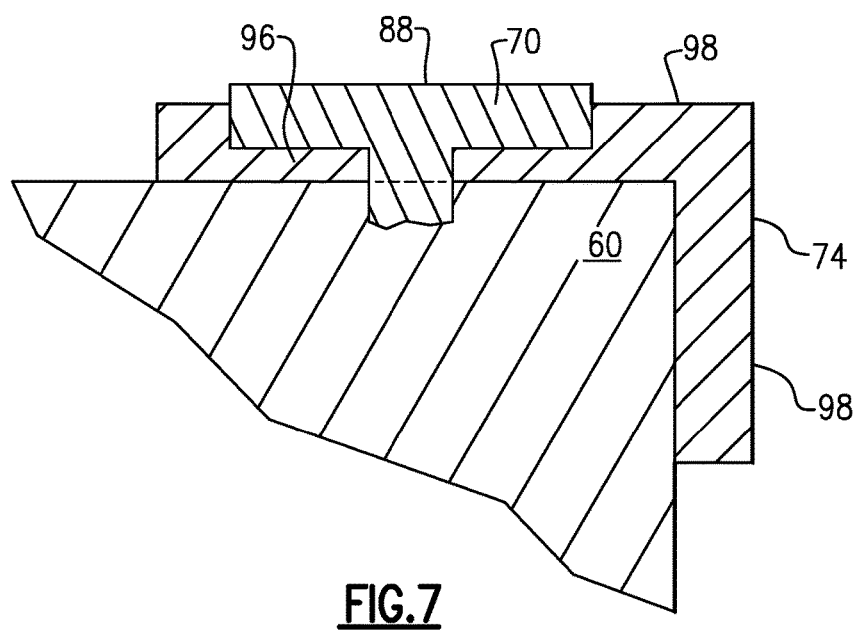
FIG. 7 shows a section view at Line 7-7 in FIG. 6.

Referring now to FIGS. 5 to 7, the example terminal holders 74 include a locating feature 90 to engage a corresponding locating feature on an axially adjacent terminal holder 74. When engaged, the locating feature 90 positions the terminal holder 74 relative to the axially adjacent terminal holder 74. In this example, the terminal holders are positioned in a welding position when the locating feature 90 is engaged.

The example locating features comprise an extension 90e received within an aperture 90a. The extension 90e is received within the aperture 90a as the axially adjacent cells 60 are moved toward each other along the axis A as shown in FIG. 5.

The positioning of the extension 90e within the aperture 90a in the assembled battery pack 24 acts as a locator for the terminal holder 74. When the extension 90e is within the aperture 90a, contact between the extension 90e and the terminal holder 74 providing the aperture 90a limits or prevents relative vertical and horizontal movement between the terminal holder 74 having the extension 90e and the terminal holder 74 having the aperture 90a.

In this disclosure, vertical and horizontal is with reference to ground. Differences in vertical and horizontal relationships refer generally to an orientation where the terminal holders 74 and the battery pack 24 are on level ground or are installed within an electrified vehicle that is on level ground.

The extension 90e within the aperture 90a can also prevent relative lateral movement between the axially adjacent terminal locators. In such an example, the extension 90e and aperture 90a together provide a four-way locator, which locates vertically and horizontally.

In other examples, the aperture 90a is significantly larger than the extension 90e in a lateral direction. In such examples, the aperture 90a and the extension 90e provide a two-way locator. Thus, the locator can provide two-way (vertical or horizontal) locating in some examples, and in other examples the locator can provide four-way (vertical and horizontal) locating.

The aperture 90a and the extension 90e are molded together with the terminal holder 74 in this example. The aperture 90a, the extension 90e, or both, could also be machined into the terminal holder 74 after a machining step.

Each terminal holder 74 includes an aperture 90a on one axial side and an extension 90e on an axial side facing in an opposite direction. In other examples, one of the terminal holders can include apertures and an axially adjacent terminal holder apertures. The terminal holders could also include combinations of apertures, extensions, or both, on the same side.

The terminal 70 sits within an area of the terminal holder 74 on a ledge 96. The ledge 96 is recessed from a top surface 98 of the terminal holder 74. The terminal 70 is located directly against the ledge 96. Thus, the vertical and horizontal alignment of the terminal 70, and specifically the upwardly facing surface 86, can be controlled through adjustments to the vertical and horizontal alignment of the terminal holder 74.

Contact between the terminal 70 and the ledge 96 holds the terminal holder 74 in position. The terminal holder 74 could also be snap-fit to one of the battery cells 60 instead of, or in addition to, being sandwiched between the terminal 70 and the battery cells 60.

After the extensions 90e are inserted within the respective apertures 90a and the cells 60 are compressed axially, the bus bar 56 is welded to the upwardly facing surfaces 88. The extensions 90e with the apertures 90a ensure that the upwardly facing surfaces 88 are aligned vertically and horizontally.

The extensions 90e may be pins, tabs, etc. The apertures 90a can be any type of aperture suitable for limiting movement of the extensions 90e includes slots, depressions, holes, etc.

In addition to providing locating functionality, the terminal holder 74 electrically isolates the terminal 70 from the sidewalls 78 through a downwardly extending flange 99. In previous designs, separate structures have been incorporated into battery packs to provide a dielectric property between the terminal and sidewalls. The example terminal holder 74, through the downwardly extending flange 99, electrically isolates the terminal 70 from the sidewalls 78 without requiring an additional part.

The example battery pack 24 is air-cooled. In other example battery packs 24, the battery cells 60 are disposed on a cooling plate. Coolant circulating through the cooling plate absorbs thermal energy from the battery cells 60. In such examples using a cooling plate, locating the terminal holders and terminals may further help locate the battery cells and thereby provide a flatter, more planar downwardly facing surface to interface with the cold plate.

Features of the disclosed examples include a terminal holder that positions a terminal for welding, the terminal holder eliminates and reduces the vertical misalignment issues, horizontal misalignment issues, or both associated with cells when compressed prior to welding bus bars to terminals. Vertical and horizontal misalignment can lead to, among other things, inconsistent welds, defects, or both. In some designs without terminal locators, the upwardly facing surfaces of one of the terminal can be vertically and horizontally misaligned up to one millimeter from an upwardly facing surface of an axially adjacent terminal and likewise in the horizontal direction.

The locators within the terminal holder can also provide a more consistent interface to facilitate temperature readings from, for example, thermistors that are part of the bus bar assembly.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A battery assembly, comprising:
   a first terminal holder; and
   a first terminal of a first battery cell at least partially surrounded by the first terminal holder, wherein the first terminal holder includes a locating feature to position the first terminal holder relative to a second terminal holder that at least partially surrounds a second terminal of a different, second battery cell.

2. The battery assembly of claim 1, wherein the locating feature comprises an extension.

3. The battery assembly of claim 2, wherein the second terminal holder includes an aperture to receive the extension.

4. The battery assembly of claim 1, wherein the locating feature comprises a extension extending from a first side of the first terminal holder, wherein the first terminal holder further includes an aperture in a second side to receive an extension of third terminal holder, the first side facing away from the second side.

5. The battery assembly of claim 1, wherein the locating feature positions the first terminal holder relative to the second terminal holder to position the terminal vertically and horizontally.

6. The battery assembly of claim 1, further comprising a flange of the first terminal holder that electrically isolates the first terminal from a sidewall of a battery pack.

7. The battery assembly of claim 1, further comprising a bus bar welded to both the first terminal at least partially surrounded by the first terminal holder and the second terminal at least partially surrounded by the second terminal holder such that the same bus bar is welded to both the first and second terminals.

8. The battery assembly of claim 1, further comprising the second terminal holder at least partially surrounding the second terminal of the second battery cell; and
    a bus bar module attached to both the first terminal and second terminal, wherein the first terminal holder engages the second terminal holder through the locating feature that positions the first terminal relative to the second terminal.

9. The battery assembly of claim 8, wherein the locating feature comprises an extension receivable within an aperture.

10. The battery assembly of claim 9, wherein the first terminal holder includes the extension and the second terminal holder provides the aperture, the first terminal holder further including an aperture to receive an extension of a third terminal holder.

11. The battery assembly of claim 8, wherein the bus bar module is welded to the first terminal and the second terminal.

12. The battery assembly of claim 8, wherein the first terminal holder engages the second terminal holder through the locating feature to vertically and horizontally position the first terminal relative to the second terminal.

13. The battery assembly of claim 8, further comprising a flange of the first terminal holder that electrically isolates the terminal from a side rail of a battery pack.

14. The battery assembly of claim 1, wherein the locating feature contacts the first terminal.

15. The battery assembly of claim 1, further comprising the first battery cell as a prismatic battery cell.

16. The battery assembly of claim 15, wherein the first battery cell is encased.

17. The battery assembly of claim 1, wherein the first terminal holder circumferentially surrounds the first terminal.

* * * * *